US010951693B2

(12) United States Patent
Lau et al.

(10) Patent No.: US 10,951,693 B2
(45) Date of Patent: Mar. 16, 2021

(54) DATA PRIORITIZATION AND SCHEDULING SYSTEM

(71) Applicant: T-Mobile USA, Inc., Bellevue, WA (US)

(72) Inventors: Kevin Lau, Issaquah, WA (US); Timothy Shelton, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 256 days.

(21) Appl. No.: 15/943,656

(22) Filed: Apr. 2, 2018

(65) Prior Publication Data

US 2019/0306228 A1 Oct. 3, 2019

(51) Int. Cl.
*H04L 29/08* (2006.01)
*H04L 12/26* (2006.01)
*H04L 12/721* (2013.01)
*H04L 12/751* (2013.01)

(52) U.S. Cl.
CPC ............ *H04L 67/101* (2013.01); *H04L 43/08* (2013.01); *H04L 43/16* (2013.01); *H04L 45/02* (2013.01); *H04L 45/70* (2013.01); *H04L 67/1008* (2013.01); *H04L 67/2814* (2013.01)

(58) Field of Classification Search
CPC ..... H04L 67/10–67/2814; H04L 43/08–43/16; H04L 45/02–45/70
See application file for complete search history.

(56) References Cited

U.S. PATENT DOCUMENTS

| 9,537,888 | B1 | 1/2017 | McClintock et al. |
| 2015/0007173 | A1 | 1/2015 | Ionescu et al. |
| 2015/0156131 | A1* | 6/2015 | Pomerantz .............. H04L 67/10 709/226 |
| 2016/0352588 | A1 | 12/2016 | Subbarayan et al. |
| 2017/0250855 | A1 | 8/2017 | Patil et al. |
| 2017/0295246 | A1* | 10/2017 | Georgiou .............. H04L 67/148 |

(Continued)

OTHER PUBLICATIONS

U.S. Appl. No. 15/943,659, Final Office Action dated Mar. 30, 2020, 47 pages.

(Continued)

*Primary Examiner* — Clayton R Williams
(74) *Attorney, Agent, or Firm* — Han Santos, PLLC; Nabil A. Abdalla

(57) ABSTRACT

The present disclosure describes techniques for monitoring telemetry data that relates to processing of client data on one or more data cluster(s) and dynamically re-routing client data to another data cluster for processing, based on an analysis of the telemetry data. Particularly, a Load Balancing and Data Prioritization (LB-DP) system is described that can monitor telemetry data associated with processing client data, and further generate a cluster-telemetry metric for each data cluster that quantifies whether a user experience on a client device is likely to be influenced by a data latency (I.e. delay) in processing client data. In some examples, the LB-DP System may prioritize processing some instances of client data over others, based on client profile data that prioritizes some clients over others. In other examples, the LB-DP system may selectively schedule a later time interval for processing of an instance of client data.

20 Claims, 9 Drawing Sheets

(56) References Cited

U.S. PATENT DOCUMENTS

2018/0048525 A1    2/2018    Karasaridis et al.
2018/0054458 A1    2/2018    Marck et al.
2018/0287907 A1   10/2018   Kulshreshtha et al.
2019/0123984 A1    4/2019    Nainar et al.

OTHER PUBLICATIONS

U.S. Appl. No. 15/943,659, Non-Final Office Action dated Sep. 13, 2019, 46 pages.

U.S. Appl. No. 15/943,659, Notice of Allowance dated Jul. 10, 2020, 64 pages.

\* cited by examiner

DATA PRIORITIZATION AND SCHEDULING SYSTEM

BACKGROUND

In a telecommunications environment, a service provider may receive significant volumes of real-time communications data from client devices. Each instance of real-time communications data may be assigned to a data cluster for processing by a core network, and further response to the client device. To accommodate such volumes of real-time communications data, telecommunications service providers allocate a plurality of data clusters at multiple geographic locations to support the computational needs of the processing the real-time communications data, namely central processing unit (CPU) and memory capabilities.

Moreover, the present-day cloud-based environment permits telecommunications service providers to monitor and scale a data cluster's CPU and memory resources to better suit processing requirements for real-time communications data. However, monitoring and scaling a data cluster's CPU and memory resources may not adequately correlate with a change in latency of processing times experienced by a client device, particularly in period of network congestion. Thus, even though a service provider may monitor and scale CPU and memory resources to support fluctuations in network congestion, the latency of processing times that is experienced at the client device may be left unmonitored and unchanged.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
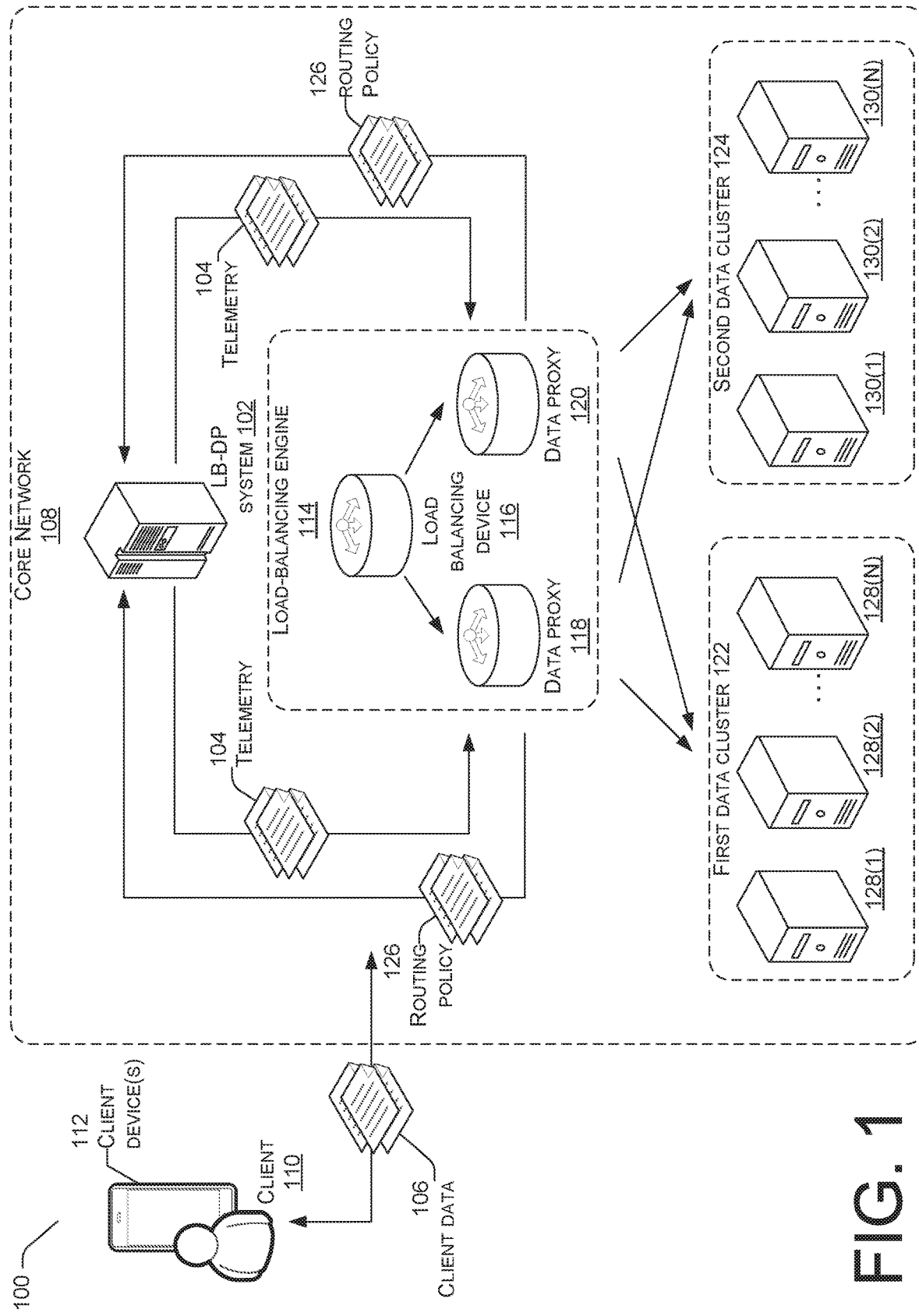
FIG. 1 illustrates a schematic view of a computing environment that facilitates Load Balancing and Data Prioritization (LB-DP) system.

This disclosure describes techniques for monitoring telemetry data that relates to processing of client data on one or more data cluster(s) and dynamically re-routing the client data to another data cluster for processing, based on an analysis of the telemetry data. Particularly, a Load Balancing and Data Prioritization (LB-DP) System is described that can monitor telemetry data associated with processing client data on one or more data cluster(s) in a cloud-based environment of a telecommunications network.

Present day, a telecommunications service provider may monitor and scale Central Processing Unit (CPU) and memory resources of a data cluster to support periods of network congestion. Even though CPU and memory resources can provide a data cluster with more resources to process more client data, the act of providing more resources does not proportionally correlate to reducing the processing times of client data. Since a user experience on a client device is ultimately influenced by the data latency (I.e. delay) in processing client data, the LB-DP system is configured to monitor a data latency for processing client data on one or more data cluster(s), and in doing so, dynamically route or re-route, client data from one data cluster to another, in response to determining that the data latency is greater than or equal to a predetermined telemetry threshold (i.e. reflective of data latency) that will likely influence a user experience at a client device.

In one example, the LB-DP system may determine that data latency for a first data cluster is greater than or equal to a predetermined telemetry threshold, and in doing so route future, yet to be processed, client data to a second data cluster. Further, the LB-DP system may selectively re-route client data currently being processed by the first data cluster to the second data cluster to expedite a processing time and relieve (i.e. bleed a current workload of) the first data cluster.

In various examples, the LB-DP system may be further configured to prioritize and schedule the processing of one set of client data over another, based on a set of prioritization and scheduling rules. For example, the LB-DP system may selectively prioritize the processing of client data associated with select number of clients, such as particular business clients, new clients, Very Important Person (VIP) clients, or client's that have historically experienced problems with processing times over the telecommunications network. In each of these examples, the LB-DP system may associate a priority score with client profile data of the client, and in doing so, determine whether to process the set of client data using a nominally designated data cluster, preferentially process the set client data on a data cluster exhibiting relatively low levels of data latency, or schedule an alternate time interval to process the client data.

In one example, the LB-DP system may identify a client profile data based on telemetry data associated with an instance of client data that has been processed by a data cluster. For example, telemetry data received by the LB-DP system may include an identifier associated with the underlying client data. The LB-DP system may use the identifier to retrieve a corresponding client profile data from a datastore, native to the LB-DP system. The identifier may correspond to a client identifier, a device identifier, a client account identifier, or any other form of identifier that correlates the client data with client profile data.

Further, the LB-DP system may generate a priority score for each instance of client data, based on the client profile data. The priority score may be alpha-numeric (i.e. 0 to 10, or A to F), a descriptive expression (i.e. low, medium, or high), based on color (i.e. red, yellow, or green), or any other suitable scale that reflects a priority for data processing of client data by a data cluster.

In a first non-limiting example, the LB-DP system may generate a priority score for an instance of client data that is greater than a first predetermined priority threshold. An administrator of the LB-DP system may set the first predetermined priority threshold to reflect a threshold priority value for a set of first-string, preferential clients. For example, the LB-DP system may selectively assign a priority score that is greater than the first predetermined priority threshold for preferential business clients, new clients, Very Important Person (VIP) clients, or clients who have historically experienced problems with processing times over the telecommunications network. In this example, the LB-DP system may selectively process a set of client data associated with these clients via a data cluster exhibiting low levels of data latency relative to other data clusters.

In a second non-limiting example, the LB-DP system may generate a priority score for an instance of client data that is greater than a second predetermined priority threshold, but less than the first predetermined priority threshold. An administrator of the LB-DP system may set the second predetermined priority threshold to reflect a threshold priority value for a set of second-string clients. Second string clients may include regular business clients, regular clients, or clients that have not historically experienced problems with processing times over the telecommunications network. In this example, the LB-DP system may selectively process a set of client data associated with second-string clients via a data cluster exhibiting low levels of data latency relative to other data clusters, in an order of priority following the first-string, preferential clients.

In a third non-limiting example, the LB-DP system may generate a priority score for an instance of client data that is less than the second predetermined priority threshold. In this example, the priority score less than the second predetermined priority threshold may reflect a set of third-string clients that may include low-paying clients, clients whom are financially in-arrears, or clients that infrequently use the telecommunications network. In this example, the LB-DP system may selectively process a set of client data associated with third-string clients via a data cluster exhibiting low levels of data latency relative to other data clusters, in an order of priority following the second-string clients.

Alternatively, the LB-DP system may selectively schedule an alternate time interval to process the client data associated with third-string clients. In this example, the LB-DP system may determine that current data cluster resources cannot adequately support the first-string, second-string, and third-string clients. In an order of reverse-priority, the LB-DP system may selectively assign an alternate time interval to process client data associated with the third-string clients, second-string clients, and first-string clients, based on relative priority scores. More specifically, the LB-DP system may generate and transmit a message to an originating client device, indicating that the instance of client data sent by the client device should be re-sent for processing during the assigned, alternate time interval. In some examples, the LB-DP system may use one or more trained machine learning models to select an alternate time interval, based at least in part on non-peak network congestion patterns.

Further, the LB-DP system may adjust a priority score associated with the instance of client data that is being re-scheduled for processing at an alternate time interval. The LB-DP system may set the adjusted priority score to be greater that the first predetermined priority threshold, for the duration of the alternate time interval. In this way, the LB-DP system may ensure that the instance of client data is preferentially processed during the alternate time interval.

In the illustrated example, the LB-DP system may be communicatively coupled to one or more load-balancing engines that are distributed at different geographical locations. Each load-balancing engine may be configured to co-ordinate distribution of client data among one or more data clusters that service of a predetermined geographic region. Further, each load-balancing engine may comprise of a load-balancing device and one or more data proxy devices. The load-balancing device may be configured to apportion client data traffic between one or more data proxy devices. In one example, the load-balancing device may divide client data traffic into equivalent portions between one or more data proxy devices. In another example, the load-balancing device may divide client data traffic into portions that are substantially equivalent to the processing capability accessible by each data proxy. For example, one data proxy may be communicatively coupled to two data clusters, each with 100 nodes, while a second data proxy may be communicatively coupled to two data clusters, each with 50 nodes. In this example, the load-balancing device may selectively apportion client data based on a ratio of 2:1 between the first data proxy and the second data proxy.

Additionally, the data proxy devices may be configured to selectively transmit instances of client data received from a load-balancing device to one or more data clusters for processing. Once each instance of client data is processed, the data proxy may further initiate transmission of the processed data to the originating client device. In the illustrated example, the LB-DP system may receive telemetry data from each data proxy to determine whether a user experience is being affected by processing times at a data cluster. In doing so, the LB-DP system may further analyze the telemetry data and provide a I to each data proxy indicating which data cluster is to process an instance of client data. The routing policy may be influenced by the telemetry data and priority score associated with each instance of client data.

In some examples, the LB-DP system may generate and transmit a routing policy data packet that includes computer executable instructions that automatically execute a routing policy on a data proxy. Alternatively, or additionally, the LB-DP system may transmit the routing policy data packet to the load balancer that is communicatively coupled to one or more data proxy devices. In one example, the routing policy may include instructions for a first data proxy to route future, yet to be processed, instances of client data from a first data cluster to a second data cluster. Further, the routing policy also selectively re-route instances of client data from a first data cluster to a second data cluster to expedite a processing time and relieve (i.e. bleed a current workload of) the first data cluster.

In these examples, the first data cluster and the second data cluster may be communicatively coupled to the first data proxy; or, alternatively, the first data cluster may be communicatively coupled to the first data proxy and the second data cluster may be communicatively coupled to another, second data proxy. In this latter example, the routing policy may further include instructions for the first data proxy to re-route the instance of client data to the second data proxy, and per instructions, for the second data proxy to further re-route the instance of client data to the intended second data cluster. In some examples, the first data proxy and the second data proxy may service a same geographic region. In other examples, the first data proxy and the second data proxy may service different geographic region. A geographic region may be defined by a service region of a telecommunications service provider.

In the illustrated example, the LB-DP system may use telemetry data received from a data proxy to determine a data latency for an instance of client data. The telemetry data may include a first timestamp indicating a point in time when an instance of client data was received by a data proxy for processing by a data cluster, and a second timestamp indicating when a second point in time when the instance of client data was processed by a designed data cluster. In this way, the LB-DP system may use the first timestamp and the second timestamp (i.e. telemetry data) to determine a data latency (i.e. telemetry metric) for the instance of client data being processed on the data cluster.

Further, the LB-DP system may generate cluster-telemetry metric that is based on an aggregation of telemetry metrics for each instances of client data that has been processed by a cluster within a predetermined time interval. An administrator of the LB-DP system may set the predetermined time interval. In some examples, the LB-DP system may generate the cluster-telemetry metric by aggregating the telemetry metrics of instances of client data based on a cumulative distribution function.

Moreover, the LB-DP system may further determine that processing of client data by a first data cluster is likely to negatively impact user experience based on a first cluster-telemetry metric associated with the first data cluster being less than a predetermined telemetry threshold. An administrator of the LB-DP system may set the predetermined telemetry threshold. In doing so, the LB-DP system may selectively route future client data to a second data cluster, and selectively re-route select client data from the first data cluster to the second data cluster on the basis that the second data cluster has a cluster-telemetry metric that is less than the first cluster-telemetry metric, the predetermined telemetry threshold, or a combination of both. In other words, the LB-DP system may identify a second data cluster on the basis of the second data cluster being less likely to negatively impact a user experience at a client device, relative to the first data cluster.

In some examples, the LB-DP system may select an alternate data cluster from a plurality of data clusters that are communicatively coupled to one or more data proxy devices. On this basis, the LB-DP system may select an alternate data cluster from the plurality of data clusters based at least in part on a lowest value, cluster-telemetry metric. As discussed earlier, a selection of an alternate data cluster may be conditional on the cluster-telemetry metric of the alternate data cluster being less than the cluster-telemetry metric of the first data cluster, the predetermined telemetry threshold, or a combination of both.

In the illustrated example, the LB-DP system may further analyze telemetry data associated with a data cluster that is assigned a cluster-telemetry metric greater than or equal to the predetermined telemetry threshold. For example, the LB-DP system may generate a subset of client data that comprises of instances of client data with individual telemetry metrics that are greater than the predetermined telemetry threshold. In other words, the LB-DP system is analyzing the client data to identify each instance of client data is likely responsible for the cluster-telemetry metric being greater than the predetermined telemetry threshold.

Further, the LB-DP system may retrieve client profile data associated with each instance of client data within the subset of client data. Using one or more trained machine learning models, the LB-DP system may parse through the client profile data to identify data patterns between the instances of client data. For example, the data patterns may correspond to a common device type, a common operating system, a common firmware version associated with the operating system, or a common application that is initiating the processing of the instance of client data.

In this way, the LB-DP system may further infer a causal factor for the cluster-telemetry metric being greater than or equal to the predetermined telemetry threshold, based at least in part on the data patterns. Further, the LB-DP system may report the causal factor to an administrator of the LB-DP system. Moreover, LB-DP system may generate a routing policy for the subset of client data that is intended to re-route, albeit segregate, the subset of client data from a data cluster to another data cluster, thus improving an operational integrity of the data cluster. Alternatively, the LB-DP system may terminate processing of the subset of client data and schedule a later time interval for processing the subset of client data. This later alternative may provide the administrator of the LB-DP system with sufficient time to address the causal factor associated with the subset of client data that caused the cluster-telemetry metric to be greater than or equal to the predetermined telemetry threshold.

Further, the LB-DP system may use telemetry data received from a data proxy to monitor an operational integrity of the data proxy, a data cluster communicatively coupled to the data proxy, or a combination of both. The telemetry data may include CPU utilization for processing client data, memory utilization for processing client data, storage capacity for processing the client data, or any combination thereof. In some examples, the LB-DP system may monitor the data proxy or the data cluster on a continuous basis, per a predetermined schedule, or in response to a triggering event. An administrator of the LB-DP system may set the predetermined schedule. Further, the triggering event may correspond to instructions, from the LB-DP system, to determine whether to re-route client data to a data cluster associated with the data proxy, from another data cluster. The triggering event may also correspond to receipt of a communication relating to the operational integrity of the data proxy or a data cluster communicatively coupled to the data proxy.

In one example, the LB-DP system may selectively determine that a data cluster is non-operational. In this example, the LB-DP system may generate a routing policy that includes instructions to re-route client data currently being processed by the data cluster to another data cluster, and route future client data, yet to be processed by the non-operational data cluster but intended for the non-operational data cluster, to another data cluster. Further, the LB-DP system may generate a routing policy data packet for transmission to the data proxy associated with the non-operational data cluster. The routing policy data packet may include computer executable instructions that dynamically execute the routing policy at the data proxy.

In another example, the LB-DP system may selectively determine that a data proxy is non-operational. In this example, the LB-DP system may generate a routing policy for transmission to the load-balancing device that is associated with the non-operational data proxy. The routing policy may include instructions to re-route client data currently being processed by the data proxy, to another data proxy, and route future client data, yet to be processed via the non-operational data proxy but intended for the non-operational data proxy, to another data proxy. Further, the LB-DP system may generate a routing policy data packet for transmission to the load-balancing device associated with the non-operational data proxy. The routing policy data packet may include computer executable instructions that dynamically execute the routing policy on the load-balancing device.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a schematic view of a computing environment that facilitates Load Balancing and Data Prioritization (LB-DP) system 102. The LB-DP system 102 may be configured to monitor telemetry data 104 that associated with processing of client data 106 on one or more data cluster(s) of a core network 108 of a telecommunications service provider.

In the illustrated example, a client 110, using a client device(s) 112, may transmit client data 106 to the core network 108 of the telecommunications service provider. The client data 106 may relate to data request or data response initiated by a proprietary application, a preloaded partner application, a third-party application native to the client device(s) 112. In a non-limiting example, the client 110 may receive, via the client device(s) 112, a conditional or non-conditional product-service offering from a service provider. To accept the product-service offering, the client 110 may transmit, via the client device(s) 112, a data response to the core network 108. In this example, the data response may constitute the client 110.

Moreover, the client 110 may be received by a load-balancing engine 114 of the core network 108. In some examples, the load-balancing engine 114 may be part of the core network 108 that provides telecommunications services to a particular geographic region. The load-balancing engine 114 may comprise of a load-balancing device 116 and one or more data proxy device(s). In the illustrated example, the load-balancing engine 114 comprises of two data proxy devices, namely data proxy device 118 and data proxy device 120, and each of data proxy device 118 and data proxy device 120 are communicatively coupled to a first data cluster 122 and a second data cluster 124. In other examples, the load-balancing engine 114 may include any number of data proxy devices, each of which may be communicatively coupled to any number of data clusters.

Further, the load-balancing device 116 may be configured to apportion, via instruction from the LB-DP system 102, network traffic relating to client data 106 into portions that are substantially equivalent to a processing capability that is accessible (i.e. first data cluster 122 and second data cluster 124) by each data proxy (i.e. data proxy device 118 and data proxy device 120). In the illustrated example, data proxy device 118 and data proxy device 120 have equivalent access to the first data cluster 122 and the second data cluster 124. Therefore, the load-balancing engine 114 may apportion client data 106 into substantially equivalent portions for data proxy device 118 and data proxy device 120, based on substantially similar access to data resources, first data cluster 122 and second data cluster 124.

In the illustrated example, the LB-DP system 102 may monitor and retrieve telemetry data 104 from data proxy device 118 and data proxy device 120 that relates to processing of client data 106 by the first data cluster 122 and the second data cluster 124. The telemetry data 104 may include a first timestamp indicating a first point in time when an instance of client data 106 was received by a data proxy, and a second timestamp indicating a second point in time when the instance of client data 106 was processed by the first data cluster. In other examples, the telemetry data 104 may also include an identifier associated with the underlying instance of client data 106 that may be used to identify client profile data, CPU utilization for processing client data 106, memory utilization for processing client data 106, and storage capacity for processing the client data 106.

In this way, the LB-DP system 102 may analyze the telemetry data 104 that generate a routing policy 126 that directs indicating which of the first data cluster 122 or the second data cluster 124 is to process an instance of client data 106. The routing policy 126 may include instructions for one of data proxy device 118 or data proxy device 120, or both, to route future, yet to processed, instances of client data 106 from first data cluster 122 to the second data cluster 124, or vice versa. Further, the routing policy 126 may also selectively re-route instances of client data 106 being processed by one of the first data cluster 122 or the second data cluster 124 to the other, to expedite a processing time and relieve a current workload.

In the illustrated example, a telecommunications service provider may provide telecommunications and data communications in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. The computing environment 100 may include a core network 108. The core network 108 may provide telecommunication and data communication services to multiple client devices, such as a 3G-compatible client device and an LTE an LTE-compatible client device, collectively referred to as client device(s) 112. The client device(s) 112, load-balancing device 116, and data proxy device 118, data proxy device 120 may correspond to any sort of electronic device operating on the telecommunications network, such as a cellular phone, a smart phone, a tablet computer, an electronic reader, a media player, a gaming device, a personal computer (PC, a laptop computer), etc. The client device(s) 112 may have a subscriber identity module (SIM), such as an eSIM, to identify the respective electronic device to a telecommunications service provider network (also referred to herein as "telecommunications network").

Moreover, the first data cluster 122 may include one or more computing device(s) 128(1)-128(N), and the second data cluster 124 may include one or more computing device(s) 130(1)-130(N). The one or more computing device(s) 128(1)-1280(N) and computing device(s) 130(1)-130(N) may include one or more interfaces to enable communications with other networked devices, such as the client device(s) 112, the load-balancing device 116, data proxy device 118, and data proxy device 120 via one or more network(s).

Additionally, the LB-DP system 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the client device(s) 112, the load-balancing device 116, data proxy device 118, and data proxy device 120 via one or more network(s). The one or more network(s) may include public networks such as the Internet, private networks such as an institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Figure 2:
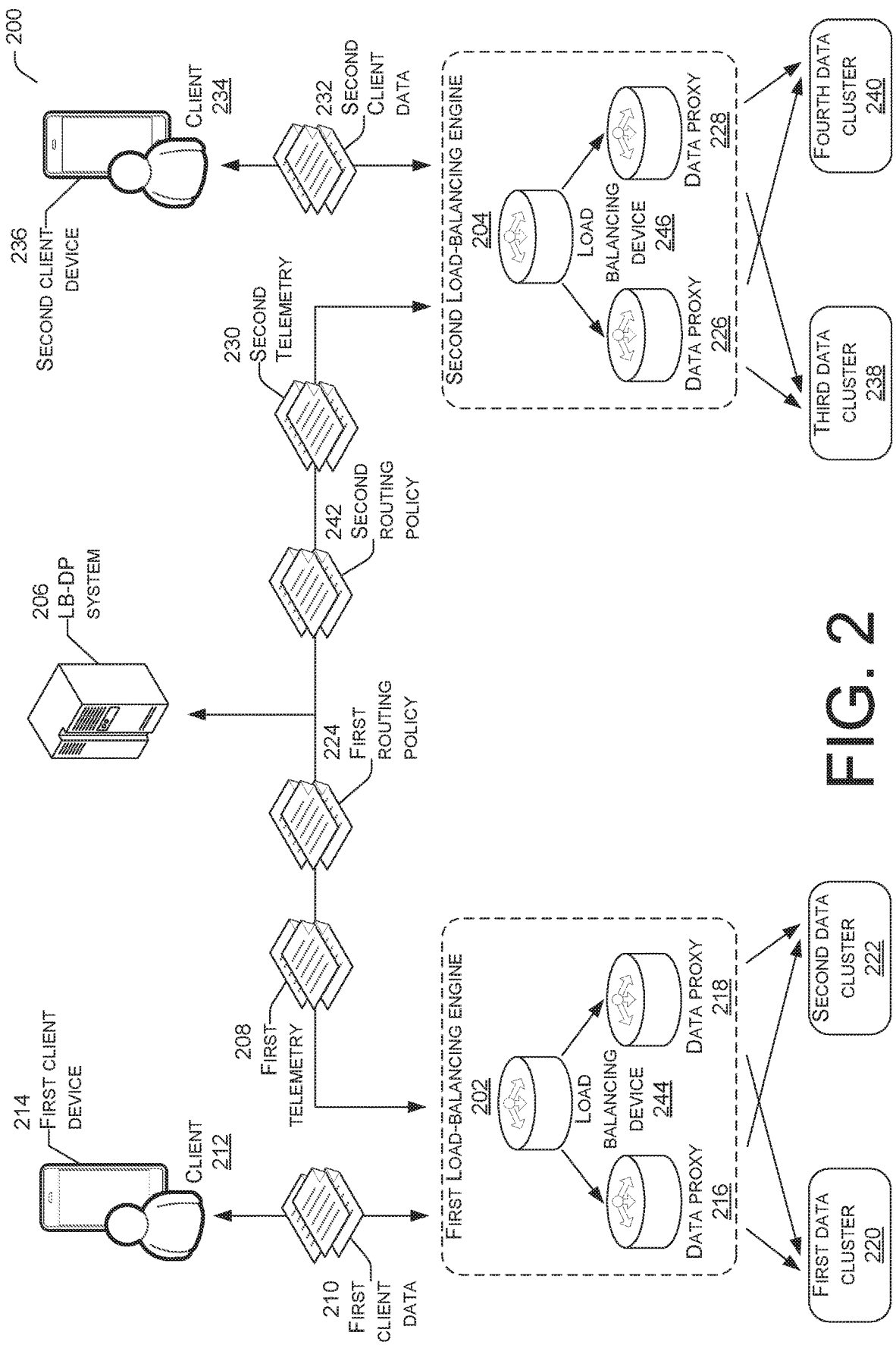
FIG. 2 illustrates a schematic view of a computing environment that facilitates a dynamic re-allocation of client data for processing between one or more data clusters.

FIG. 2 illustrates a schematic view of a computing environment 200 that facilitates a dynamic re-allocation of client data between a first load-balancing engine 202 and a second load-balancing engine 204 of a core network 108. In the illustrated example, the LB-DP system 206 may be communicatively coupled to one or more load-balancing engines, such as the first load-balancing engine 202 and the second load-balancing engine 204. In various examples, the first load-balancing engine 202 and the second load-balancing engine 204 may be distributed at different geographic locations, however may remain communicatively connected via the LB-DP system 206.

In one non-limiting example, the LB-DP system 206 may receive a first telemetry data 208 that is associated with a first client data 210 transmitted by a client 212 of a first client device 214. In this example, the first client data 210 may be received by a data proxy device 216 or data proxy device 218 of the first load-balancing engine 202 for processing by one of the first data cluster 220 or the second data cluster 222. Further, the LB-DP system 206 may parse through the first telemetry data 208 and generate a first routing policy 224 that instructs data proxy device 216 or data proxy device 218 to re-route the first client data 210 to another data proxy device 226 or data proxy device 228 associated with the second load-balancing engine 204. In some examples, the LB-DP system 206 may generate the first routing policy 224 based on a comparison of data latency between the data clusters at the first load-balancing engine 202 and the second load-balancing engine 204.

In another non-limiting example, the LB-DP system 206 may receive a second telemetry data 230 that is associated with a second client data 232 transmitted by a client 234 of a second client device 236. In this example, the second client data 232 may be received by data proxy device 226 or data proxy device 228 of the second load-balancing engine 204 for processing by one of the third data cluster 238 or the fourth data cluster 240. Further, the LB-DP system 206 may parse through the second telemetry data 230 and generate a second routing policy 242 that instructs data proxy device 226 or data proxy device 228 to re-route the second client data 232 to another data proxy device 216 or data proxy device 218 associated with the first load-balancing engine 202.

Additionally, the LB-DP system 206 may correspond to LB-DP system 102; first client device 214 and second client device 236 may correspond to client device(s) 112; the first load-balancing engine 202 and the second load-balancing engine 204 may correspond to a load-balancing engine 114. Further, it follows that the load-balancing device(s) 244 and 246 may correspond to a load-balancing device 116; data proxy device(s) 216, 218, 226, and 228 may correspond to one of data proxy device 118 or data proxy device 120; and, first data cluster 220, second data cluster 222, the third data cluster 238, and the fourth data cluster 240 correspond to one of the first data cluster 122 and the second data cluster 124.

Figure 3:
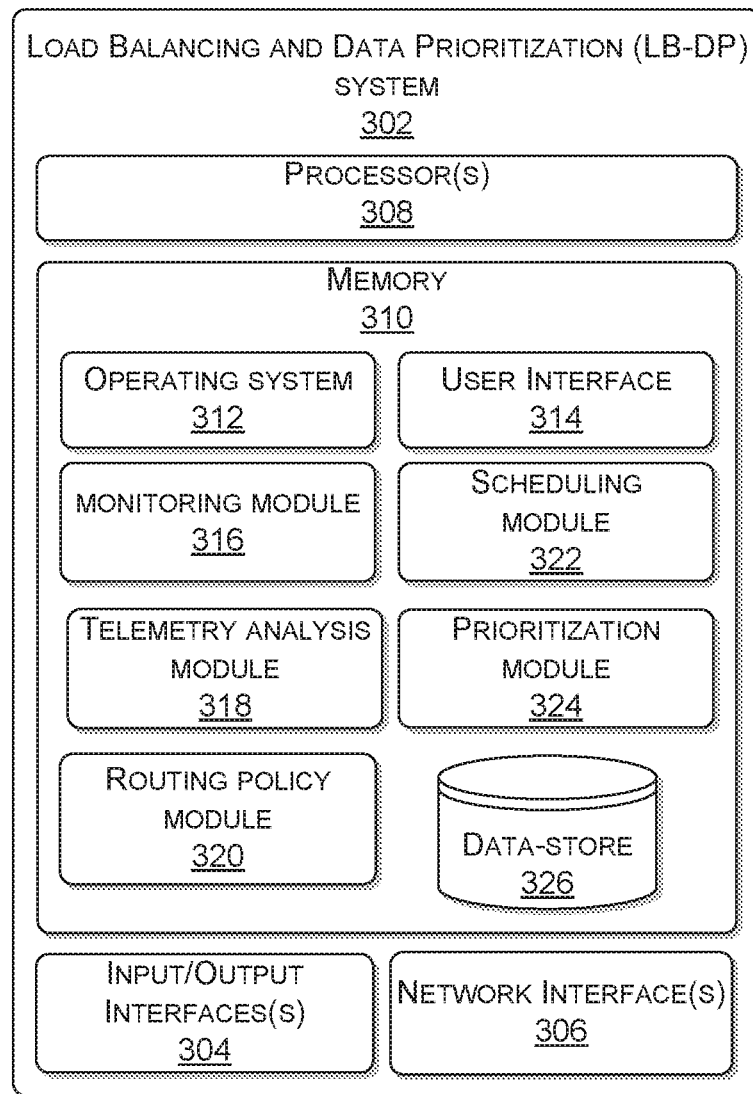
FIG. 3 illustrates a block diagram of various components of a Load Balancing and Data Prioritization (LB-DP) system.

FIG. 3 illustrates a block diagram of various components of a Load Balancing and Data Prioritization (LB-DP) system. The LB-DP system 302 may include routines, program instructions, objects, and/or data structures that perform particular tasks or implement abstract data types. Further, the LB-DP system 302 may include input/output interface(s) 304. The input/output interface(s) 304 may include any type of output interface known in the art, such as a display (e.g. a liquid crystal display), speakers, a vibrating mechanism, or a tactile feedback mechanism. Input/output interface(s) 304 also include ports for one or more peripheral devices, such as headphones, peripheral speakers, or a peripheral display. Further, the input/output interface(s) 304 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the LB-DP system 302 may include network interface(s) 306. The network interface(s) 306 may include any sort of transceiver known in the art. For example, the network interface(s) 306 may include a radio transceiver that performs the function of transmitting and receiving radio frequency communications via an antenna. In addition, the network interface(s) 306 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 306 may include wired communication components, such as an Ethernet port or a Universal Serial Bus (USB).

Further, the LB-DP system 302 may include one or more processor(s) 308 that are operably connected to memory 310. In at least one example, the one or more processor(s) 308 may be a central processing unit(s) (CPU), graphics processing unit(s) (GPU), a both a CPU and GPU, or any other sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 308 may also be responsible for executing all computer applications stored in the memory, which can be associated with common types of volatile (RAM) and/or nonvolatile (ROM) memory.

In some examples, memory 310 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 310 may include an operating system 312, user interface module 314, monitoring module 316, telemetry analysis module 318, routing policy module 320, scheduling module 322, prioritization module 324, and data store 326. The operating system 312 may be any operating system capable of managing computer hardware and software resources.

The user interface module 314 may enable an administrator of the LB-DP system 302 to configure one or more predetermined thresholds relating to telemetry and priority scores. Further, the user interface module 314 may present an administrator with an indication of a causal factor relating to data latency on one or more data cluster(s).

The monitoring module 316 may monitor an operational integrity of a data proxy or a data cluster that is communicatively coupled to the data proxy. In one example, the monitoring module 316 may monitor the data proxy or the data cluster on a continuous basis, per a predetermined schedule, or in response to a triggering event.

The telemetry analysis module 318 may receive telemetry data associated with a data cluster from one of a data proxy or a load-balancing device. The telemetry data may include a first timestamp indicating a first point in time when an instance of client data was received by a data proxy, and a second timestamp indicating a second point in time when the instance of client data was processed by the first data cluster, CPU utilization for processing client data, memory utilization for processing client data, storage capacity for processing the client data, or any combination thereof.

Further, the telemetry analysis module 318 may parse through telemetry data to determine an operational integrity of a data proxy, data cluster, or a combination of both. The telemetry analysis module 318 may also generate telemetry metrics for individual instances of client data and cluster-telemetry metrics for data clusters.

The prioritization module 324 may assign a priority score to instances of client data based at least in part on corresponding client profile data. The priority score may be alpha-numeric (i.e. 0 to 10, or A to F), a descriptive expression (i.e. low, medium, or high), based on color (i.e. red, yellow, or green), or any other suitable scale that reflects a priority for data processing of client data by a data cluster.

In some examples, the priority score may delineate between different tiers of clients. In a non-example, a priority score increasing from one to 10 may correspond to tiers of clientele ranging from a third-string to a first string. For example, first-string clients may correspond to preferential business clients, new clients, Very Important Person (VIP) clients, or clients who have historically experienced problems with processing times over the telecommunications network; second-string clients may correspond to regular business clients, regular clients, or clients that have not historically experienced problems with processing times over the telecommunications network; and, third-string clients may correspond to include low-paying clients, clients whom are financially in-arrears, or clients that infrequently use the telecommunications network.

Further, the prioritization module 324 may also include a first predetermined priority threshold and a second predetermined priority threshold that is intended to delineate between each of the first, second, and third-string clientele. For example, the first predetermined priority threshold is higher than the second predetermined priority threshold. Further the first predetermined priority threshold is intended to distinguish between first-string clients (i.e. preferential business clients, etc.) and second-string clients (i.e. regular business clients, etc.). In other words, a priority score that is greater than the first predetermined priority threshold is intended to indicate that the corresponding client is a first-string client. Further, the second predetermined priority threshold is intended to distinguish between second-string clients (I.e. regular business clients, etc.) and third-string clients (i.e. low-value clients, etc.). In this instance, a priority score that is less than the second predetermined priority threshold is intended to indicate that the corresponding client is a third-string client. Further, a priority score that is greater than the second predetermined priority score but less than the first predetermined priority score is intended to indicate that the corresponding client is a second-string client.

The scheduling module 322 may selectively scheduling the processing of an instance of client data at a designated cluster for an alternate time interval. In an order of reverse-priority, the LB-DP system may selectively assign an alternate time interval to process client data associated with the third-string clients, second-string clients, and first-string clients, based on relative priority scores. In some examples, the scheduling module may use one or more trained machine learning models to select the alternate time interval.

The routing policy module 320 may generate a routing policy to route and re-route client data based at least in part on an analysis of telemetry data by the telemetry analysis module 318 and further inputs from the prioritization module 324 and scheduling module 322. In some examples, the routing policy module 320 may generate a routing policy to route future client data, yet to be processed by a data cluster to another data cluster. The routing policy may further include re-routing client data being processed by a data cluster to another data cluster.

Moreover, the routing policy module 320 may further generate a routing policy data packet that includes computer executable instructions that dynamically execute the routing policy on one of a load-balancing device or a data proxy.

The data store 326 may include a repository of client profile data associated client devices that have registered with the telecommunications network. Further, the data store 326 may include a repository of current and historical predetermined thresholds relating to priority and telemetry. Further, the data store 326 may include historical patterns of peak and non-peak network congestion, for which the scheduling module 322 may use to determine an alternate time to schedule processing of client data.

FIGS. 4, 5, 6, 7, 8, and 9 present processes 400, 500, 600, 700, 800, and 900 that relate to operations of the Load Balancing and Data Prioritization (LB-DP) system. Each of processes 400, 500, 600, 700, 800, and 900 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, 600, 700, 800, and 900 are described with reference to the computing environment 100 of FIG. 1.

Figure 4:
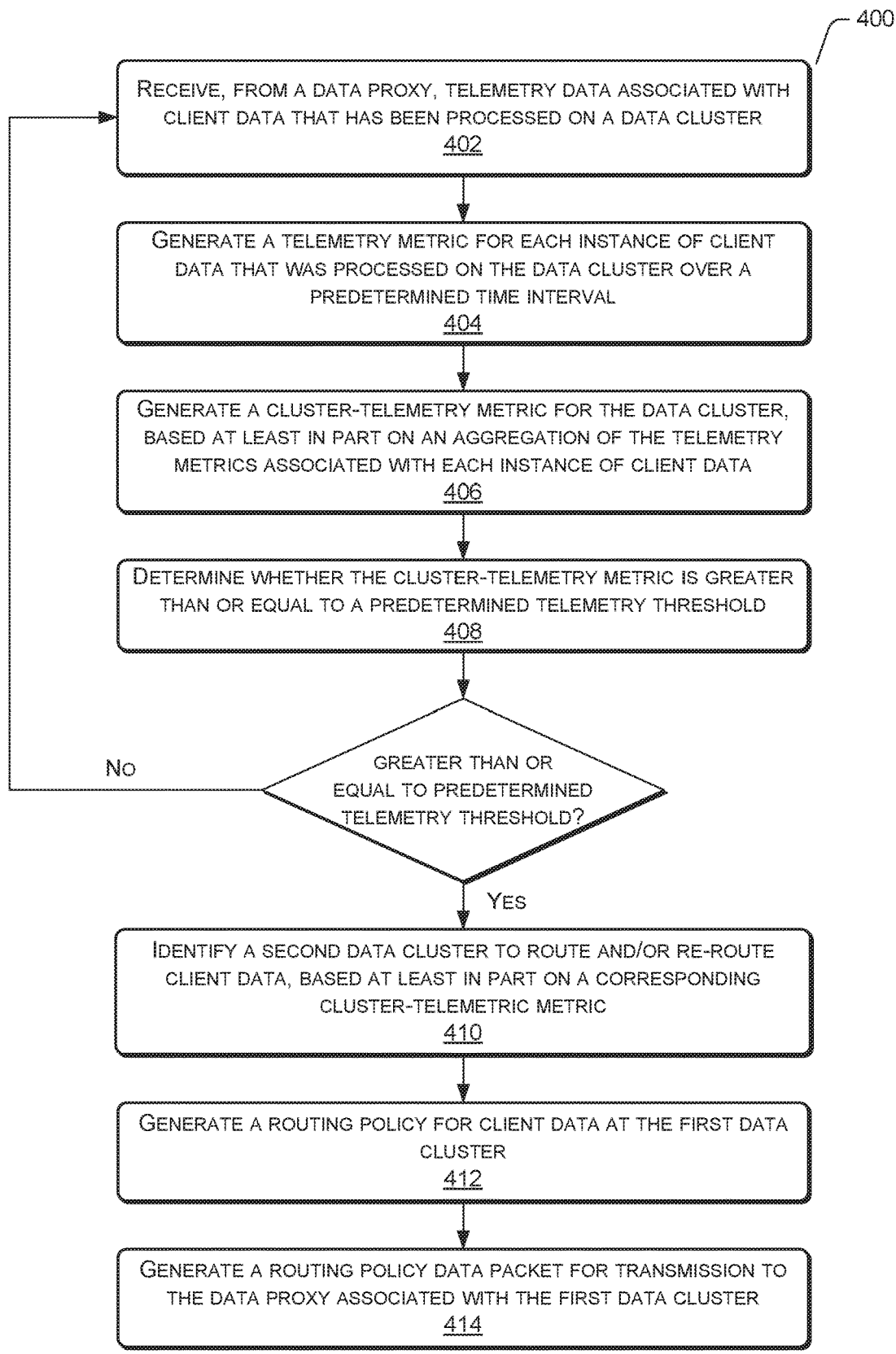
FIG. 4 illustrates a flow diagram of a Load Balancing and Data Prioritization (LB-DP) system process for generating a routing policy for client data currently being processed on a first data cluster.

FIG. 4 illustrates a flow diagram of a Load Balancing and Data Prioritization (LB-DP) system process for generating a routing policy for client data currently being processed on a first data cluster. In various examples, the routing policy may be used to route future, yet to be processed, client data from a first data cluster to a second data cluster. Alternatively, or additionally, the routing policy may be used to selectively re-route client data that is currently being processed by the first data cluster to the second data cluster. In doing so, the LB-DP system may expedite processing time and relieve (i.e. bleed a current workload of) the first data cluster.

At 402, the LB-DP system may receive, from a data proxy, telemetry data associated with client data that has been processed on a first data cluster, over a predetermined time interval. The telemetry data may relate to processing of individual instances of client data that are transmitted to the telecommunications network via one or more client devices. In some examples, the telemetry data may include a first timestamp indicating a first point in time when an instance of client data was received by a data proxy, and a second timestamp indicating a second point in time when the instance of client data was processed by the first data cluster. In other examples, the telemetry data may also include an identifier associated with the underlying instance of client data that may be used to identify client profile data, CPU utilization for processing client data, memory utilization for processing client data, and storage capacity for processing the client data.

At 404, the LB-DP system may generate a telemetry metric for each instance of client data that was processed on the first data cluster over the predetermined time interval. In one example, the LB-DP system use the first timestamp and the second timestamp (i.e. telemetry data) associated with each instance of client data to determine a corresponding measure of data latency (i.e. telemetry metric). The data latency may reflect the time taken by the first data cluster to process the instance of client data.

At 406, the LB-DP system may generate a cluster-telemetry metric for the first data cluster, based at least in part on an aggregation of the telemetry metrics associated with each instance of client data. In some examples, the LB-DP system may generate the cluster-telemetry metric by aggregating the telemetry metrics of each instance of client data based on a cumulative distribution function.

At 408, the LB-DP system may determine whether the cluster-telemetry metric is greater than or equal to a predetermined telemetry threshold. The predetermined telemetry threshold may reflect a threshold value, above which the LB-DP system can infer that processing client data on the first data cluster may negatively impact user experience at a client device. In one example, the predetermined telemetry threshold may relate to upper limit of data latency that is permitted for processing client data on a first data cluster. In this example, the cluster-telemetry metric may similarly reflect data latency for processing client data on the first data cluster. Thus, a cluster-telemetry metric that is greater than or equal to the predetermined threshold may denote that the data latency associated with processing client data on the first data cluster is long enough (i.e. data latency presumptively measured in increments of time) to negatively impact a user experience at a client device.

In one example, the LB-DP system may determine that the cluster-telemetry metric for the data cluster is less than the predetermined telemetry threshold, and in doing so, the LB-DP system process may return to step 402. In response to determining that the cluster-telemetry metric is less than the predetermined telemetry threshold, the LB-DP system can infer that processing client data on the data cluster, based on the cluster-telemetric metric, is unlikely to negatively impact a user experience at a client device.

At 410, the LB-DP system may determine that the first cluster-telemetry metric is greater than the predetermined telemetry threshold. In doing so, the LB-DP system can infer that processing client data on the first data cluster is likely to negative impact a user experience at a client device. Therefore, the LB-DP system may identify a second data cluster to route and/or re-route client data, based at least in part on a corresponding cluster-telemetry metric. Selection of the second data cluster may be based on a corresponding cluster-telemetry metric being less than the first cluster-telemetry metric, the predetermined telemetry threshold, or a combination of both. In other words, the LB-DP system may identify a second data cluster on the basis of the second data cluster being less likely to negatively impact a user experience at a client device, relative to the first data cluster.

At 412, the LB-DP system may generate a routing policy for client data at the first data cluster. The routing policy may include instructions to route future client data that is intended for the first data cluster to the second data cluster, and re-route a portion of client data from the first data cluster to the second data cluster to expedite a processing time and relieve (i.e. bleed a current workload) the first data cluster.

At 414, the LB-DP system generate a routing policy data packet for transmission to the data proxy associated with the first data cluster. The routing policy data packet may include computer-executable instructions that dynamically execute the routing policy for the first data cluster.

Figure 5:
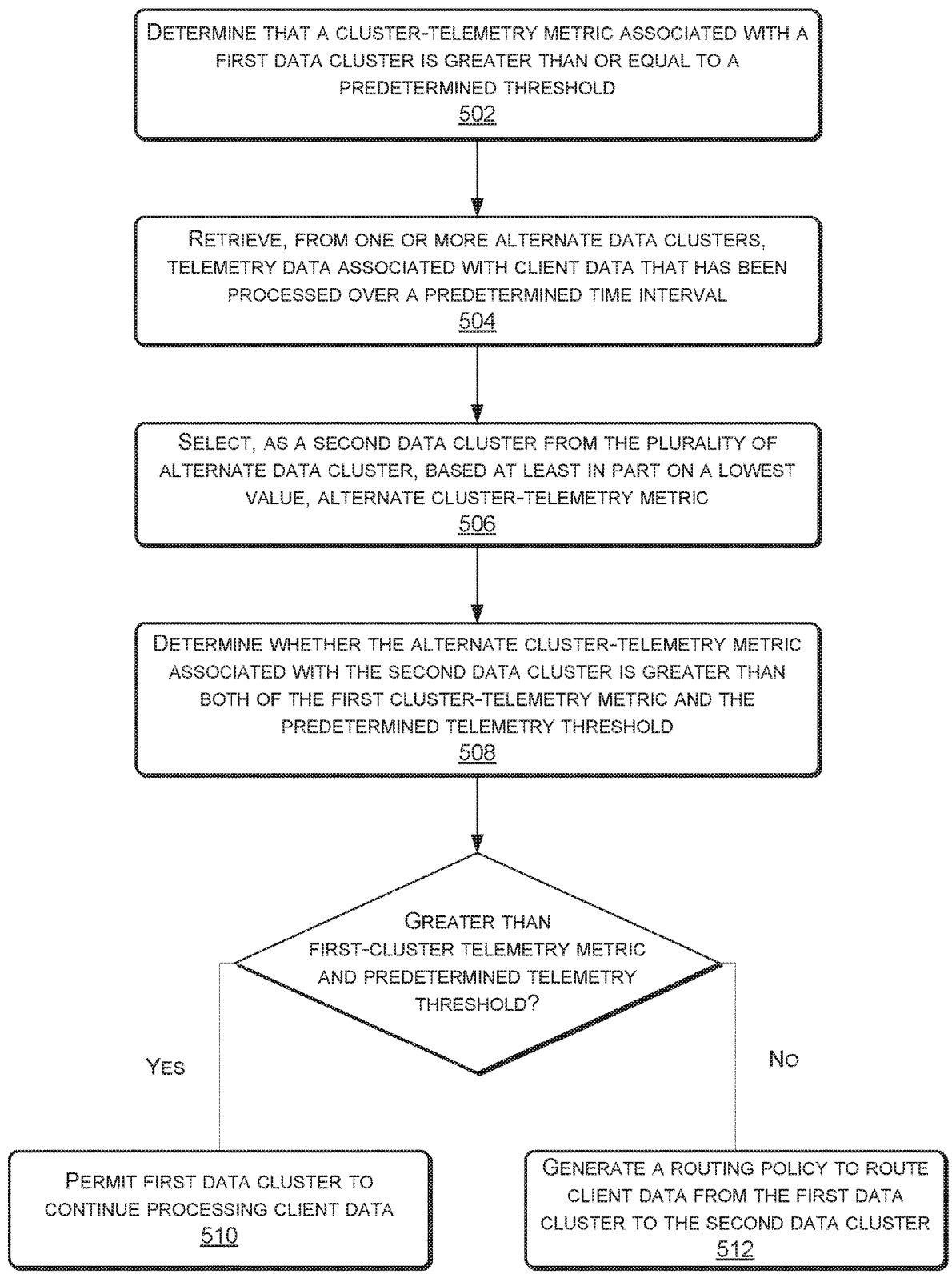
FIG. 5 illustrates a flow diagram of a Load Balancing and Data Prioritization (LB-DP) system process for selecting an alternate data cluster to route or re-route client data.

FIG. 5 illustrates a flow diagram of a Load Balancing and Data Prioritization (LB-DP) system process for selecting an alternate data cluster to route or re-route client data. In various examples, the LB-DP system may interrogate a plurality of alternate data clusters over the telecommunications network.

At 502, the LB-DP system may determine that a cluster-telemetry metric associated with a first data cluster is greater than or equal to a predetermined telemetry threshold. In other words, the LB-DP system may infer that processing client data on the first data cluster is long enough to negatively impact a user experience at a client device.

At 504, the LB-DP system may retrieve, from one or more alternate data clusters, telemetry data associated with client data that has been processed over a predetermined time interval, and further generate corresponding cluster-telemetry metrics for each alternate data cluster.

At 506, the LB-DP system may select a second data cluster from the plurality of alternate data clusters based at least in part on a lowest value, alternate cluster-telemetry metric. In doing so, the LB-DP system may infer that selection of the second data cluster is more likely to positively impact a user experience at a client device, relative to the remaining the plurality of data clusters.

At 508, the LB-DP system may determine whether the alternate cluster-telemetry metric associated with the second data cluster is greater than both of the first cluster-telemetry metric and the predetermined telemetry threshold. In other words, the LB-DP system may select the second data cluster on the basis of the second data cluster is less likely to negatively impact a user experience at a client device, relative to the first data cluster.

At 510, the LB-DP system may determine that the alternate cluster-telemetry metric associated with the second data cluster is greater than both the first cluster-telemetry metric and predetermined telemetry threshold. In other words, the LB-DP system may infer that routing client data from the first data cluster to the second data cluster may worsen a negative impact of user experience at a client device, relative to the first data cluster.

In this instance, the LB-DP system may permit the first data cluster to continue processing the client data. Alternatively, the LB-DP system may terminate processing of a portion of client data at the first data cluster and selectively schedule another time to process the portion of client data. The LB-DP system may select the portion of client data based on relative priority scores associated with each instance of client data.

At 512, the LB-DP system may determine that the alternate cluster-telemetry metric associated with the second data cluster is not greater than both the first cluster-telemetry metric or the predetermined telemetry threshold. In other words, the alternate cluster-telemetry metric is at least less than the first cluster-telemetry metric. In this example, the LB-DP system may infer that routing client data from the first data cluster to the second data cluster is less likely to negatively impact a user experience at a client device, relative to the first data cluster.

In this instance, the LB-DP system may generate a routing policy data packet for transmission to the data proxy associated with the first data cluster. The routing policy data packet may include computer-executable instructions that dynamically execute a routing policy for the first data cluster. The routing policy may include instructions to route future client data from the first data cluster to the second data cluster, and re-route a portion of client data from the first data cluster to the second data cluster. The LB-DP system may select the portion of client data based on relative priority scores associated with each instance of client data.

Figure 6:
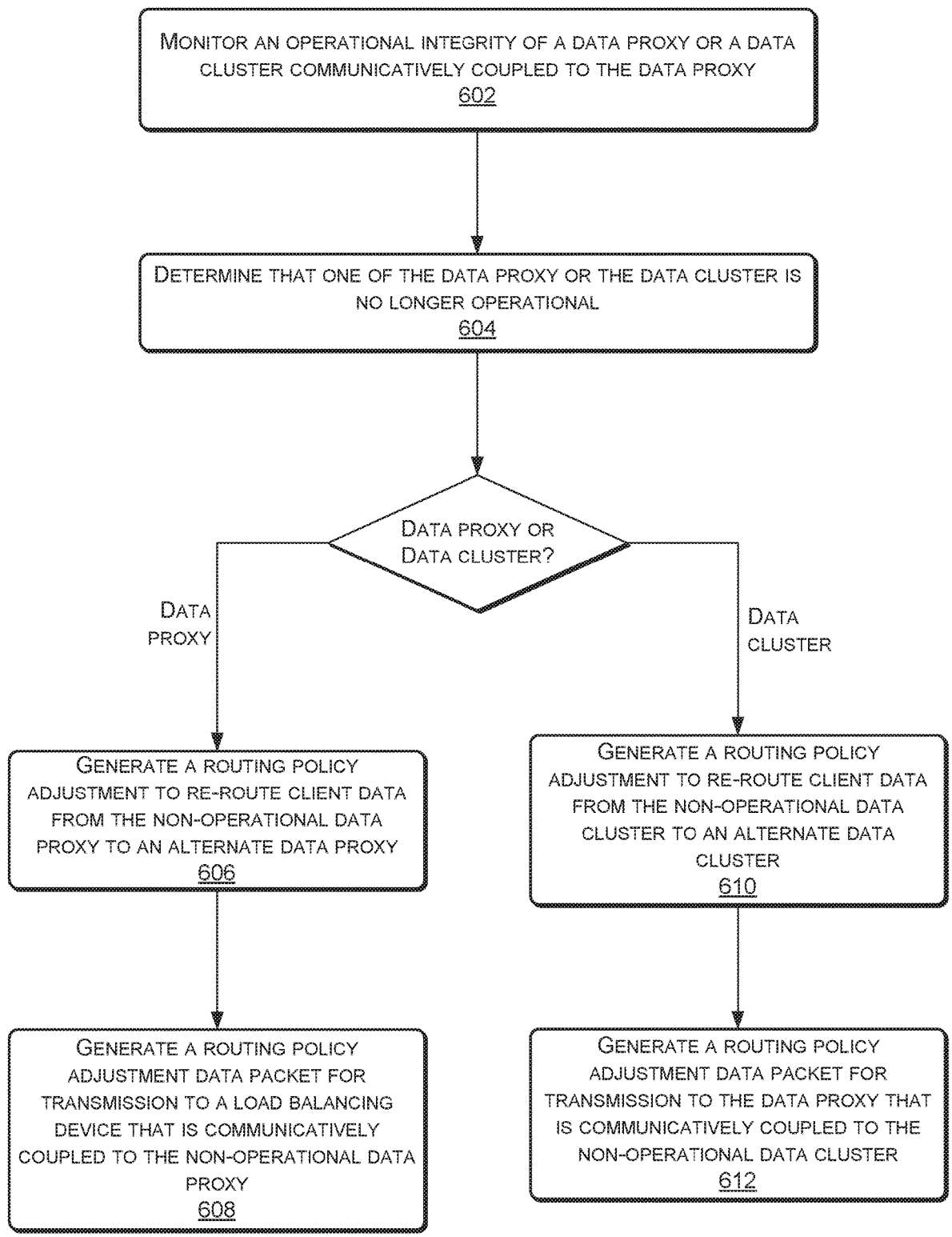
FIG. 6 illustrates a flow diagram of a Load Balancing and Data Prioritization (LB-DP) system process for routing client data based on an indication that a data proxy or a data cluster is non-operational.

FIG. 6 illustrates a flow diagram of a Load Balancing and Data Prioritization (LB-DP) system process for routing client data based on an indication that a data proxy or a data cluster is non-operational.

At 602, the LB-DP system may monitor an operational integrity of a data proxy or a data cluster communicatively coupled to the data proxy. In some examples, the LB-DP system may monitor the operational integrity of a data proxy or a data cluster on a continuous basis, per a predetermined schedule, or in response to a triggering event. The triggering event may correspond to receipt of a communication relating to the operating integrity of the data proxy or a data cluster communicatively coupled to the data proxy.

At 604, the LB-DP system may determine that one of a data proxy or the data cluster is no longer operation, based at least in part on telemetry data. In some examples, the LB-DP system may use telemetry data received from a data proxy to monitor the operational integrity of the data proxy, a data cluster communicatively coupled to the data proxy, or a combination of both. The telemetry data may include CPU utilization for processing client data, memory utilization for processing client data, storage capacity for processing the client data, or any combination thereof.

At 606, the LB-DP system may determine that the data proxy is non-operational based at least in part on the telemetry data. In doing so, the LB-DP system may generate a routing policy that includes instructions to re-route client data from the non-operational data proxy to an alternate data proxy. In one example, the non-operational data proxy and the alternate data proxy may be communicatively coupled to at least a portion of the same data clusters. In another example, the non-operational data proxy and alternate data proxy may be communicatively coupled to different data clusters.

At 608, the LB-DP system may generate a routing policy data packet for transmission to a load-balancing device that is communicatively coupled to the non-operational data proxy. The routing policy data packet may include computer executable instructions that dynamically execute the routing policy.

At 610, the LB-DP system may determine that a data cluster is non-operational, based at least in part on the telemetry data. In doing so, the LB-DP system may generate a routing policy that includes instructions to re-route client data from the non-operational data cluster to another data cluster. In one example, the non-operational data cluster and the alternate data cluster may be communicatively coupled to a same data proxy. In another example, the non-operational data cluster and the alternate data cluster may be communicatively coupled to different data proxy devices.

At 612, the LB-DP system may generate a routing policy data packet for transmission to the data proxy of the non-operational data cluster. The routing policy data packet may include computer executable instructions that dynamically execute the routing policy at the data proxy.

Figure 7:
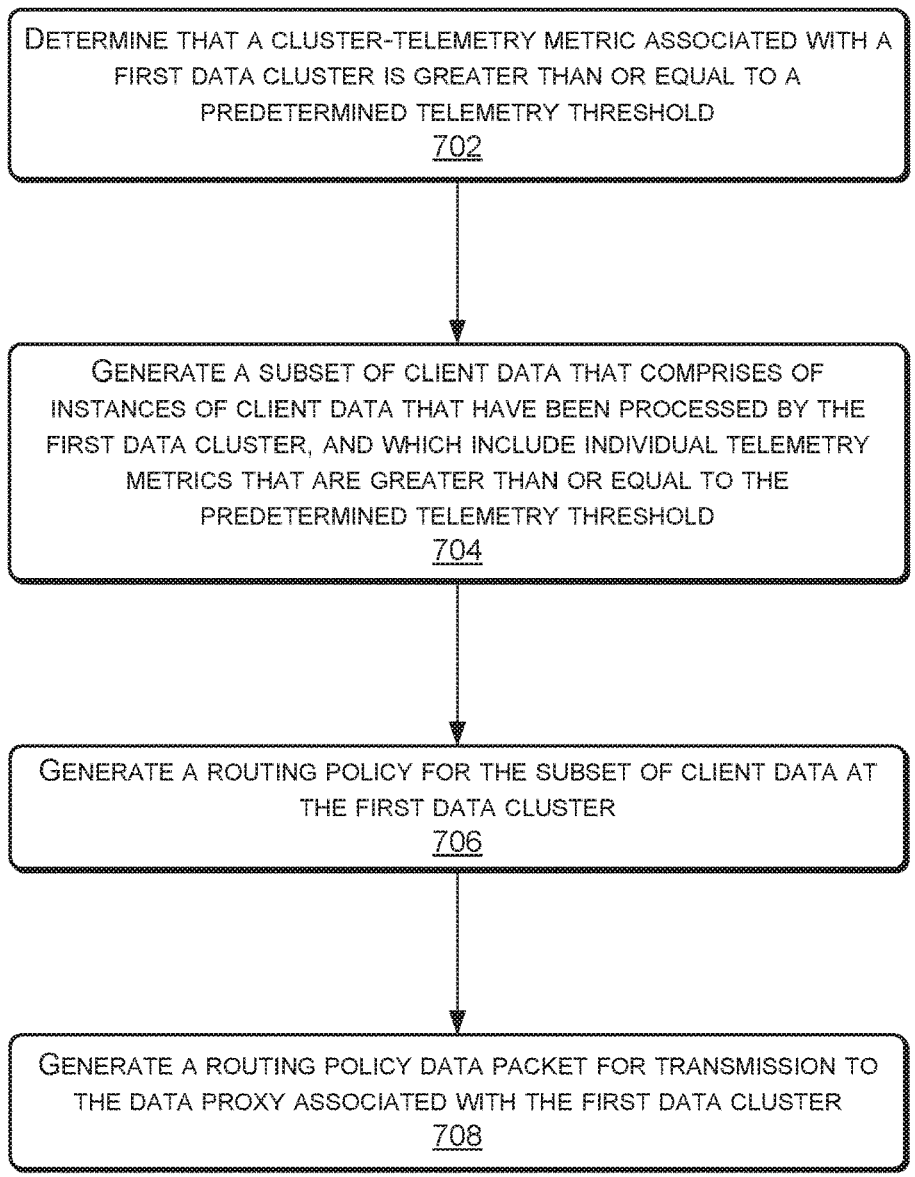
FIG. 7 illustrates a flow diagram of a Load Balancing and Data Prioritization (LB-DP) system process for re-routing at least a portion of client data on a data cluster to relieve a workload of the first data cluster.

FIG. 7 illustrates a flow diagram of a Load Balancing and Data Prioritization (LB-DP) system process for re-routing at least a portion of client data on a data cluster to relieve a workload of the first data cluster. In some examples, the LB-DP system may further parse through instance of client data associated with the first data cluster to identify a causal factor that may influence the cluster-telemetry metric of the first data cluster being greater than a predetermined telemetry threshold.

At 702, the LB-DP system may determine that a cluster-telemetry metric associated with a first data cluster is greater than or equal to a predetermined telemetry threshold. In other words, the LB-DP system may infer that processing client data on the first data cluster is long enough to negatively impact a user experience at a client device.

At 704, the LB-DP system may generate a subset of client data that comprises of instances of client data that have been processed by the first data cluster, and which include individual telemetry metrics that are greater than or equal to the predetermined telemetry threshold. In other words, the LB-DP system is analyzing the client data to identify each instance of client data is likely responsible for the cluster-telemetry metric being greater than the predetermined telemetry threshold.

In doing so, the LB-DP system may further analyze the subset of client data to determine a causal factor for the cluster-telemetry metric being greater than the predetermined telemetry threshold. In some examples, the LB-DP system may use one or more trained machine learning models to parse through client profile data to identify data patterns between instances of client data within the subset of client data. In some examples, the LB-DP system may further infer a causal factor for the cluster-telemetry metric being greater than or equal to the predetermined telemetry threshold, based at least in part on the data patterns.

At 706, the LB-DP system may generate a routing policy for the subset of client data at the first data cluster. The routing policy may include instructions to route future client data that is intended for the first data cluster to the second data cluster, and re-route the subset of client data from the first data cluster to an alternate, second data cluster. In various examples, the LB-DP system may select the alternate, second data cluster based on process 500.

At 708, the LB-DP system may generate a routing policy data packet for transmission to the data proxy associated with the first data cluster. The routing policy data packet may include computer executable instructions that dynamically execute the routing policy at the data proxy.

Figure 8:
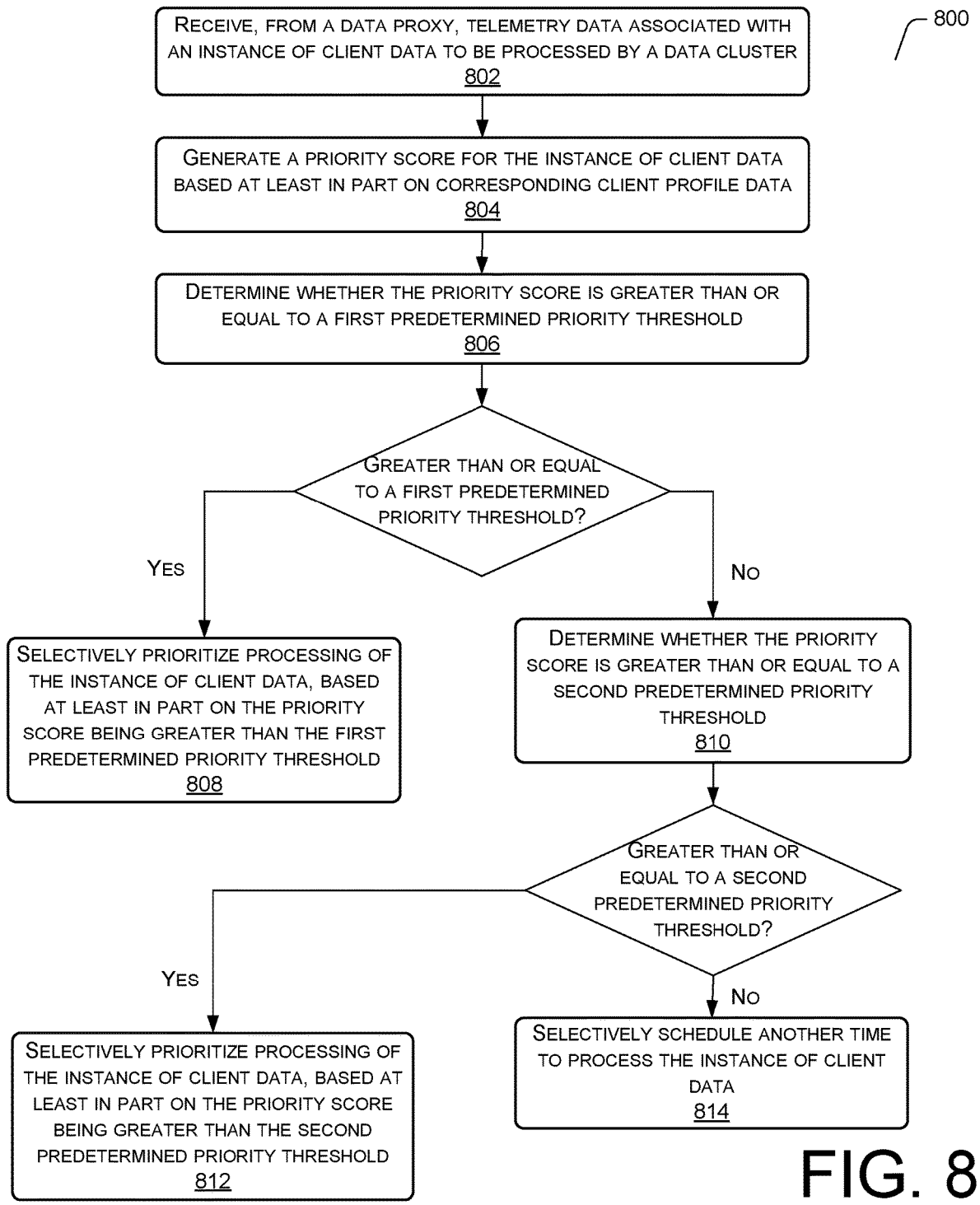
FIG. 8 illustrates a flow diagram of a Load Balancing and Data Prioritization (LB-DP) system process for routing instances of client data to an alternate data cluster based at least in part on a corresponding priority score.

FIG. 8 illustrates a flow diagram of a Load Balancing and Data Prioritization (LB-DP) system process for routing instances of client data to an alternate data cluster based at least in part on a corresponding priority score. In some examples, the LB-DP system may associate a priority score with an instance of client data, based on client profile data of the client, and in doing so, determine whether to process the instance of client data using a nominally designated data cluster, a data cluster exhibiting relatively low levels of data latency in comparison to other data clusters, or schedule an alternate time interval to process the instance of client data.

At 802, the LB-DP system may receive, from a data proxy, telemetry data associated with an instance of client data that is to be processed by a data cluster. The telemetry data may include an identifier that is associated with the underlying instance of client data. The LB-DP system may further retrieve client profile data associated with the instance of client data, based at least in part on the identifier.

At 804, the LB-DP system may generate priority score for the instance of client data based at least in part on the client profile data. For example, the LB-DP system may assign a priority score based on client profile data such as an indication of the client being a preferential business client, a new client, a VI client, or a client who has historically experienced problems with processing times over the telecommunications network.

In one example, a high priority score (i.e. HIGH on scale of LOW to HIGH, or 8 on a scale of 1 to 10) indicates that the LB-DP system may prioritize processing of an instance of client data over other instances of client data with relatively lower priority scores (i.e. MEDIUM on scale of LOW to HIGH, or 7 on a scale 1 to 10).

At 806, the LB-DP system may determine whether the priority score for the instance of client data is greater than or equal to a first predetermined priority threshold. In some examples, a priority score that is greater than the first predetermined priority threshold is intended to indicate that the corresponding client is a first-string client (i.e. preferential business client, etc.).

At 808, the LB-DP system may determine that the priority score for the instance of client data is greater than or equal to the first predetermined priority threshold. In doing so, the LB-DP system may selectively prioritize processing of the instance of client data, relative to other instances of client data, in an order of priority from high (i.e. GREEN on a scale of RED to GREEN, HIGH on a scale of LOW to HIGH, or 10 on a scale of 1 to 10) to low (i.e. RED on a scale of RED to GREEN, LOW on a scale of LOW to HIGH, or 1 on a scale of 1 to 10). In other words, the LB-DP system may assign an instance of client data with a high priority score that is greater than the first predetermined priority threshold to a data cluster exhibiting relatively low levels of latency (i.e. cluster-telemetry metric) relative to other data clusters.

At 810, the LB-DP system may determine that priority score for the instance of client data is less than the first predetermined priority threshold. In doing so, the LB-DP system may further determine whether the priority score for the instance of client data is greater than or equal to a second predetermined priority threshold. In some examples, a priority score that is greater than or equal to the second predetermined priority threshold but less than the first predetermined priority threshold may be intended to indicate that the corresponding client is a second-string client (i.e. regular business client, etc.).

At 812, the LB-DP system may determine that the priority score for the instance of client data is greater than or equal to the second predetermined priority threshold. In doing so, the LB-DP system may selectively prioritize processing the instance of client data, in an order of priority that follows the client data with a priority score that is greater than first predetermined priority threshold.

At 814, the LB-DP system may determine that the priority score for the instance of client data is less than the second predetermined priority threshold. In this example, a priority score that is less than the second predetermined priority threshold may indicate that the corresponding client is a third-string client (i.e. a low-value client, etc.).

In doing so, the LB-DP system may selectively prioritize processing the instance of client data, in an order of priority that follows the data with a priority score that is greater than the second predetermined priority threshold. Alternatively, the LB-DP system may selectively schedule another time to process the instance of client data associated with a third-string client, as described in process 900.

Figure 9:
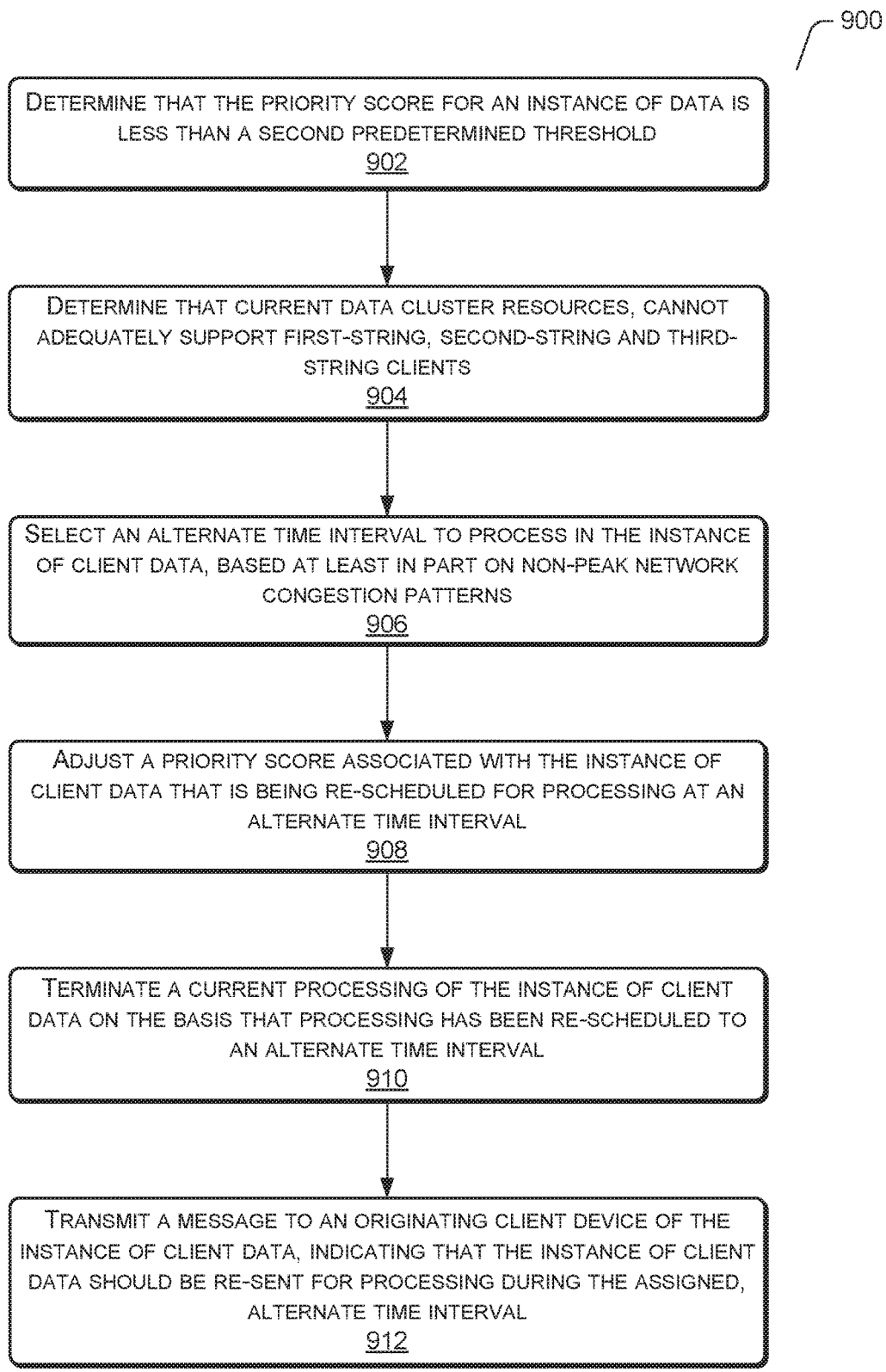
FIG. 9 illustrates a flow diagram of a Load Balancing and Data Prioritization (LB-DP) system process for selectively scheduling the processing of an instance of client data at a designated cluster for an alternate time interval.

FIG. 9 illustrates a flow diagram of a Load Balancing and Data Prioritization (LB-DP) system process for selectively scheduling the processing of an instance of client data at a designated cluster for an alternate time interval. In an order of reverse-priority, the LB-DP system may selectively assign an alternate time interval to process client data associated with the third-string clients, second-string clients, and first-string clients, based on relative priority scores.

At 902, the LB-DP system may determine that the priority score for an instance of client data is less than a second predetermined priority threshold. In this example, the priority score may indicate that the corresponding client is a third-string client (i.e. a low-value client, etc.).

At 904, the LB-DP system may determine that current data cluster resources, based on corresponding cluster-telemetry metrics, cannot adequately support the first-string, second-string, and third-string clients. Thus, as described in process 800, and in a reverse-order of priority, the LB-DP may selectively schedule another time to process the client data, first beginning with instances of client data associated with third-string clients.

At 906, the LB-DP system may select an alternate time interval to process the instance of client data, based at least in part on non-peak network congestion patterns. In some examples, the LB-DP system may use one or more trained machine learning models to select the alternate time interval.

At 908, the LB-DP system may adjust a priority score associated with the instance of client data that is being re-scheduled for processing at an alternate time interval. The LB-DP system may set the adjusted priority score to be greater that the first predetermined priority threshold, for the duration of the alternate time interval. In this way, the LB-DP system may ensure that the instance of client data is preferentially processed during the alternate time interval.

At 910, the LB-DP system may terminate a current processing of the instance of client data on the basis that processing has been re-scheduled to the alternate time interval.

At 912, the LB-DP system may transmit a message to an originating client device, indicating that the instance of client data sent by the originally client device cannot be processed at this time and should be re-sent for processing during the assigned, alternate time interval.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system comprising:
one or more processors;
memory coupled to the one or more processors, the memory including one or more modules that are executable by the one or more processors to:
receive, from a data proxy, telemetry data associated with an initial client data being processed by a first data cluster or a second data cluster over a predetermined time interval, the telemetry data corresponding to a data latency for processing the initial client data;
determine, a first telemetry metric for the first data cluster, based at least in part on a first subset of the initial client data being processed by the first data cluster;
determine a second telemetry metric for the second data cluster, based at least in part on a second subset of the initial client data being processed by the second data cluster;
receive, from the data proxy, additional telemetry data associated with an instance of additional client data that is to be processed by one of the first data cluster or the second data cluster;
retrieve, from a data-store, client profile data associated with the instance of additional client data;
determine, a priority score for the instance of additional client data;
designate, as a designated data cluster, one of the first data cluster or the second data cluster for processing of the instance of additional client data, based at least in part on the first telemetry metric, the second telemetry metric, and the priority score;
generate a routing policy for processing of the instance of additional client data by the designated data cluster; and
transmit, to the data proxy, routing policy data that includes computer executable instructions that dynamically execute the routing policy.

2. The system of claim 1, wherein the one or more modules are further executable by the one or more processors to:
designate one of the first data cluster or the second data cluster as the designated data cluster based at least in part on a corresponding lesser value of the first telemetry metric and the second telemetry metric.

3. The system of claim 1, wherein the one or more modules are further executable by the one or more processors to:
determine whether the first telemetry metric or the second telemetry metric are greater than a predetermined telemetry threshold; and
in response to determining that the first telemetry metric is greater than the predetermined telemetry threshold and the second telemetry metric is less than the predetermined telemetry threshold, designate the second data cluster as the designated data cluster.

4. The system of claim 1, wherein the one or more modules are further executable by the one or more processors to:
determine, at a first point in time, whether the priority score for the instance of additional client data is less than a predetermined priority threshold, the first point in time corresponding to receipt of the instance of additional client data, by the data proxy, from a client device; and
in response to the priority score being less than the predetermined priority threshold, identify a time interval that commences at a second point in time for processing of the instance of additional client data at the designated data cluster;
adjust the priority score for the instance of additional client data to create an adjusted priority score that is greater than the predetermined priority threshold, and wherein the adjusted priority score is temporally valid for the time interval commencing at the second point in time;
associate the adjusted priority score with the client profile data; and
transmit, to the client device, a message indicating a schedule of the time interval commencing at the second point in time for processing of the instance of additional client data, and
wherein, the routing policy further includes instructions to terminate processing of the instance of additional client data at the first point in time.

5. The system of claim 1, wherein the one or more modules are further executable by the one or more processors to:
determine, via the client profile data, a client status for a client associated with the instance of additional client data, and
wherein, the priority score for the instance of additional client data is further based at least in part on the client status.

6. The system of claim 1, wherein the one or more modules are further executable by the one or more processors to:
determine, via the client profile data, whether an unsuccessful attempt to process the instance of additional client data has previously occurred within a predetermined time interval, and
wherein, the priority score for the instance of additional client data is further based at least in part on a determination of whether the unsuccessful attempt previously occurred within the predetermined time interval.

7. A computer-implemented method, comprising:
under control of one or more processors:
receiving, via a data proxy, telemetry data associated with an initial client data being processed by a first data cluster over a predetermined time interval;
generating a first cluster-telemetry metric for the first data cluster, based at least in part on the telemetry data;
receiving, from the data proxy, additional telemetry data associated with an instance of additional client data;
retrieving, from a data-store, client profile data associated with the instance of additional client data;
determining, a priority score for the instance of additional client data, based at least in part in part on the client profile data;

generating a routing policy for the instance of additional client data, based at least in part on the first cluster-telemetry metric and the priority score; and
transmitting, to the data proxy, routing policy data packet that includes computer executable instructions that dynamically execute the routing policy.

8. The computer-implemented method of claim 7, wherein the telemetry data is a first set of telemetry data, the initial client data is a first set of client data and further comprising:
retrieving, via the data proxy, a second set of telemetry data associated with a second set of client data being processed by a second data cluster; and
generating a second cluster-telemetry metric for the second data cluster, based at least in part on the second set of telemetry data, and
wherein, generating the routing policy for the instance of additional client data is further based at least in part on a comparison of the first cluster-telemetry metric and the second cluster-telemetry metric.

9. The computer-implemented method of claim 8, further comprising:
determining that the priority score for the instance of additional client data is greater than or equal to a predetermined priority threshold; and
determining that the second cluster-telemetry metric is less than the first cluster-telemetry metric, and
wherein, generating the routing policy for the instance of additional client data routes the instance of additional client data to the second data cluster.

10. The computer-implemented method of claim 8, further comprising:
determining that the priority score for the instance of additional client data is less than a predetermined priority threshold; and
determining that the first cluster-telemetry metric is less than the second cluster-telemetry metric, and
wherein, generating the routing policy for the instance of additional client data routes the instance of additional client data to the second data cluster.

11. The computer-implemented method of claim 7, further comprising:
determining that the priority score of the instance of additional client data is less than a predetermined priority threshold;
determining a time interval that commences at a scheduled point in time for processing of the instance of additional client data at a designated data cluster;
adjusting the priority score of the instance of additional client data to create an adjusted priority score that is greater than the predetermined priority threshold; and
associating the adjusted priority score with the client profile data, the adjusted priority score being valid for the time interval that commences at the scheduled point in time, and
wherein, generating the routing policy for the instance of additional client data includes instructions to terminate a current processing of the instance of additional client data.

12. The computer-implemented method of claim 7, further comprising:
determining that a client associated with the client profile data has previously made a number of unsuccessful attempts to process the instance of additional client data, and
wherein, determining the priority score for the instance of additional client data is further based at least in part on the number of unsuccessful attempts being greater than a predetermined attempts threshold.

13. The computer-implemented method of claim 7, further comprising:
determining that a client status for a client associated with the instance of additional client data, based at least in part on the client profile data, and
wherein, determining the priority score for the instance of additional client data is further based at least in part on the client status.

14. One or more non-transitory computer-readable media storing computer-executable instructions that, when executed on one or more processors, cause the one or more processors to perform acts comprising:
receiving, via a plurality of data proxies, telemetry data associated with client data being processed by individual data clusters over a predetermined associated with the plurality of data proxies;
generating cluster-telemetry metrics for the individual data clusters that process subsets of the client data, based at least in part on the telemetry data;
receiving, from a particular data proxy of the plurality of data proxies, additional telemetry associated with an instance of additional client data;
retrieving, from a data-store, client profile data associated with an instance of the additional client data;
determining, a priority score for the instance of additional client data;
generating a routing policy for the instance of the client data, based at least in part on the cluster-telemetry metrics for the individual data clusters and the priority score for the instance of additional client data, the routing policy to identify a designated data cluster of the individual data clusters for processing of the instance of additional client data; and
transmitting, to the particular data proxy, routing policy data that includes computer executable instructions to dynamically execute the routing policy for the instance of additional client data.

15. The one or more non-transitory computer-readable media of claim 14, further storing instructions that, when executed cause the one or more processors to perform acts comprising:
determining that the priority score for the instance of additional client data is greater than a predetermined priority threshold; and
identifying a particular data cluster of the individual data clusters with a lowest-value cluster-telemetry metric relative to the cluster-telemetry metrics for remaining ones of the individual data clusters, and
wherein, generating the routing policy for the instance of the client data includes designating the particular data cluster as the designated data cluster.

16. The one or more non-transitory computer-readable media of claim 14, further storing instructions that, when executed cause the one or more processors to perform acts comprising:
determining that the priority score for the instance of the client data is less than a predetermined priority threshold;
determining a time interval that commences at a scheduled point in time for processing of the instance of additional client data at the designated data cluster;
adjusting the priority score of the instance of the client data to create an adjusted priority score that is greater than the predetermined priority threshold; and associating the adjusted priority score with the client profile data, the adjusted priority score being valid for the time interval that commences at the scheduled point in time, and wherein, generating the routing policy for the instance of the client data includes instructions to terminate a current processing of the instance of additional client data.

17. The one or more non-transitory computer-readable media of claim 14, wherein determining the priority score for the instance of additional client data is based at least in part on one or more criteria, the one or more criteria including a client status associated with a client profile or a number of unsuccessful attempts to process the instance of the client data that have previously occurred within a predetermined time interval.

18. The one or more non-transitory computer-readable media of claim 14, wherein the particular data proxy is a first data proxy, and further storing instructions that, when executed cause the one or more processors to perform acts comprising:

identifying a second data proxy of the plurality of data proxies that is associated with the designated data cluster, and wherein, the routing policy to route the instance of the client data to the designated data cluster includes computer executable instructions to re-route the instance of the client data from the first data proxy to the second data proxy.

19. The one or more non-transitory computer-readable media of claim 18, wherein the first data proxy and the second data proxy reside in geographically different locations.

20. The one or more non-transitory computer-readable media of claim 14, wherein the telemetry data is associated with at least one of a data latency for processing the client data, a Central Processing Unit (CPU) utilization for processing the client data, a memory utilization for processing client data, or a storage capacity for processing the client data.

* * * * *